US008819935B2

(12) United States Patent
Fujita et al.

(10) Patent No.: US 8,819,935 B2
(45) Date of Patent: Sep. 2, 2014

(54) METHOD FOR PRODUCING LIQUID-EJECTING HEAD

(75) Inventors: Seiichi Fujita, Shiojiri (JP); Yutaka Yamazaki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 510 days.

(21) Appl. No.: 13/079,287

(22) Filed: Apr. 4, 2011

(65) Prior Publication Data

US 2011/0308715 A1 Dec. 22, 2011

(30) Foreign Application Priority Data

Jun. 17, 2010 (JP) ................................ 2010-137994

(51) Int. Cl.

| | |
|---|---|
| ***B21D 53/76*** | (2006.01) |
| ***B23P 17/00*** | (2006.01) |
| ***B41J 2/05*** | (2006.01) |
| ***B41J 2/16*** | (2006.01) |
| *B41J 2/14* | (2006.01) |

(52) U.S. Cl.

CPC ........ *B41J 2/161* (2013.01); *B41J 2002/14491* (2013.01); *B41J 2/1632* (2013.01); *B41J 2002/14241* (2013.01); *B41J 2/1629* (2013.01); *B41J 2/1642* (2013.01); *B41J 2/1631* (2013.01); *B41J 2/1635* (2013.01); *B41J 2/1634* (2013.01); *B41J 2/1623* (2013.01); *B41J 2/1646* (2013.01)

USPC ........................................... 29/890.1; 347/58

(58) Field of Classification Search

CPC ...... B41J 2/1603; B41J 2/1626; B41J 2/1631; B41J 2/1623; B41J 2/161; B41J 2/1629; B41J 2/1632; B41J 2/1642; B41J 2/1634

USPC ........................................... 29/890.1; 347/58

See application file for complete search history.

(56) References Cited

U.S. PATENT DOCUMENTS

| | | | | |
|---|---|---|---|---|
| 7,364,273 | B2 * | 4/2008 | Takahashi | 347/68 |
| 7,559,631 | B2 * | 7/2009 | Shimada et al. | 347/64 |
| 7,891,782 | B2 * | 2/2011 | Owaki et al. | 347/68 |
| 7,905,581 | B2 * | 3/2011 | Kawaguchi et al. | 347/71 |
| 7,909,439 | B2 * | 3/2011 | Hirano et al. | 347/71 |

(Continued)

FOREIGN PATENT DOCUMENTS

| | | |
|---|---|---|
| JP | 2006-082529 | 3/2006 |
| JP | 2007-275966 | 10/2007 |

(Continued)

*Primary Examiner* — David Angwin
(74) *Attorney, Agent, or Firm* — Workman Nydegger

(57) ABSTRACT

A method for producing a liquid-ejecting head including a passage-forming substrate and a protective substrate. The passage-forming substrate has pressure-generating chambers communicating with nozzle orifices, piezoelectric devices that change the inner pressures of the pressure-generating chambers, and liquid supply channels for supplying the pressure-generating chambers. The protective substrate has a piezoelectric-device accommodating portion and a through-hole, through which wirings to lead electrodes extended from the piezoelectric devices pass thorough. The method includes forming the piezoelectric-device accommodating portion and a portion of the through-hole in the protective substrate while leaving a lid, a portion of the protective substrate, closing off an opening of the through-hole, bonding the protective substrate to the passage-forming substrate, forming the pressure-generating chambers and the liquid supply channels in the passage-forming substrate, forming a protective film on surfaces of the passage-forming substrate and the protective substrate, and removing the lid to complete the formation of the through-hole.

4 Claims, 9 Drawing Sheets

(56) References Cited

U.S. PATENT DOCUMENTS

| | | | | |
|---|---|---|---|---|
| 7,918,544 | B2 * | 4/2011 | Kawaguchi et al. | 347/68 |
| 8,312,628 | B2 * | 11/2012 | Sakuma et al. | 29/890.1 |
| 2007/0070125 | A1 * | 3/2007 | Watanabe | 347/58 |
| 2007/0182787 | A1 * | 8/2007 | Kubo et al. | 347/58 |
| 2008/0239010 | A1 * | 10/2008 | Tomita et al. | 347/58 |
| 2009/0237464 | A1 * | 9/2009 | Owaki et al. | 347/68 |
| 2011/0308715 | A1 * | 12/2011 | Fujita et al. | 156/247 |

FOREIGN PATENT DOCUMENTS

| | | |
|---|---|---|
| JP | 2008-200905 | 9/2008 |
| JP | 2009-220507 | 10/2009 |
| JP | 2009-255517 | 11/2009 |

* cited by examiner

METHOD FOR PRODUCING LIQUID-EJECTING HEAD

This application claims a priority to Japanese Patent Application No. 2010-137994 filed on Jun. 17, 2010 which is hereby expressly incorporated by reference herein in its entirety.

BACKGROUND

1. Technical Field

The present invention relates to methods for producing liquid-ejecting heads having a liquid-resistant protective film in liquid channels thereof.

2. Related Art

Examples of liquid-ejecting heads include an ink-jet recording head including a diaphragm that defines pressure-generating chambers communicating with nozzle orifices from which ink droplets are ejected and piezoelectric devices that apply pressure to ink in the pressure-generating chambers by deform the diaphragm to eject ink droplets from the nozzle orifices.

One known liquid-ejecting head includes a passage-forming substrate having piezoelectric devices and a protective substrate bonded thereto. To connect electrodes of the piezoelectric devices to a wiring substrate having a drive circuit mounted thereon, specifically, a chip-on-film (COF) substrate, a through-hole is formed in the protective substrate, and leads are extended from the piezoelectric devices into the through-hole and are connected to the COF substrate in the through-hole (see, for example, JP-A-2009-255517 (page 6, FIG. 3).

According to one known method for producing a liquid-ejecting head, a protective film of a liquid-resistant (ink-resistant) material, such as tantalum pentaoxide, is formed on the inner surfaces of liquid channels, such as a manifold (reservoir), that come into contact with liquid by chemical vapor deposition (CVD) (see, for example, JP-A-2006-82529 (page 8, FIG. 6).

According to another known method, before the pressure-generating chambers are formed by etching, the through-hole is sealed off by laminating an organic film for protecting the piezoelectric devices from etchant as a protective tape with heat so that no etchant intrudes (see, for example, JP-A-2009-220507 (page 6, FIG. 7).

A protective film must be formed in complicated liquid channels to ensure sufficient liquid resistance. Therefore, the protective film is formed in the channels using a source gas containing the protective film component. The source gas, however, also forms the protective film on the leads in the through-hole as the source gas spreads into the through-hole. If the protective film, which is an insulating film, is formed on at least the portions of the leads to be connected to the wiring substrate, a continuity failure may occur between the leads and the wiring substrate upon connecting the wiring substrate to the leads. This decreases the yield and therefore makes it difficult to provide a method for producing liquid-ejecting heads at reduced production costs.

SUMMARY

According to an aspect of the invention, there is provided a method for producing a liquid-ejecting head including a passage-forming substrate and a protective substrate bonded thereto. The passage-forming substrate has pressure-generating chambers communicating with nozzle orifices from which a liquid is ejected, piezoelectric devices that change the inner pressures of the pressure-generating chambers, and liquid supply channels through which the liquid is supplied to the pressure-generating chambers. The protective substrate has a piezoelectric-device accommodating portion that protects the piezoelectric devices and a through-hole in which portions, electrically connected to a wiring substrate, of leads extended from the piezoelectric devices are exposed. The method includes forming the piezoelectric-device accommodating portion and a portion of the through-hole in the protective substrate while leaving a lid closing off the through-hole, bonding the protective substrate to the passage-forming substrate, forming the pressure-generating chambers and the liquid supply channels in the passage-forming substrate, forming a protective film on surfaces of the passage-forming substrate and the protective substrate bonded thereto, and forming the through-hole by removing the lid.

According to the above aspect of the invention, because the through-hole, in which the portions of the leads electrically connected to the wiring substrate are exposed, is closed off by the lid before the protective film is formed, the lid prevents a source gas from intruding into the through-hole to avoid formation of the protective film on the leads extended into the through-hole. This reduces the possibility of a continuity failure between the leads and the wiring substrate, thus providing a method for producing an ink-jet recording head at reduced production costs.

The above method for producing the liquid-ejecting head preferably further includes irradiating the periphery of the lid with laser light, and the formation of the through-hole preferably includes laminating an adhesive-coated tape on the lid and removing the lid together with the adhesive-coated tape after the formation of the protective film and the laser irradiation.

In this case, because the periphery of the lid is removed or modified by irradiation with laser light, the strength thereof can be made lower than that of the other region so that the lid can be readily removed by the adhesive-coated tape.

In addition, because the adhesive-coated tape is used after the formation of the protective film and the laser irradiation, in which heat is applied, the tape does not have to be heat-resistant. This allows the use of a tape that leaves behind little adhesive residue, thus providing a method for producing an ink-jet recording head with little adhesive residue.

In the above method for producing the liquid-ejecting head, the laser irradiation preferably includes focusing the laser light in the interior of the protective substrate to form a modified region.

In this case, because the modified region is formed in the interior of the protective substrate by laser irradiation, less dust is produced as a result of surface melting due to laser irradiation. This reduces the amount of dust in the nozzle orifices, the pressure-generating chambers, and the liquid supply channels, thus providing a method for producing an ink-jet recording head with little interference of dust with liquid flows.

In the above method for producing the liquid-ejecting head, the formation of the piezoelectric-device accommodating portion preferably includes forming a portion of the through-hole while leaving the lid closing off the through-hole.

In this case, because a portion of the through-hole is formed together with the piezoelectric-device accommodating portion while leaving the lid closing off the through-hole, a method for producing an ink-jet recording head at reduced production costs without the need for an additional step can be provided.

In the above method for producing the liquid-ejecting head, the liquid is preferably an alkaline liquid, and the protective film is preferably a tantalum oxide film.

In this case, because tantalum oxide is resistant to alkali, a method for producing an ink-jet recording head with high alkali resistance can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment will now be described in detail with reference to the drawings.

Figure 1:
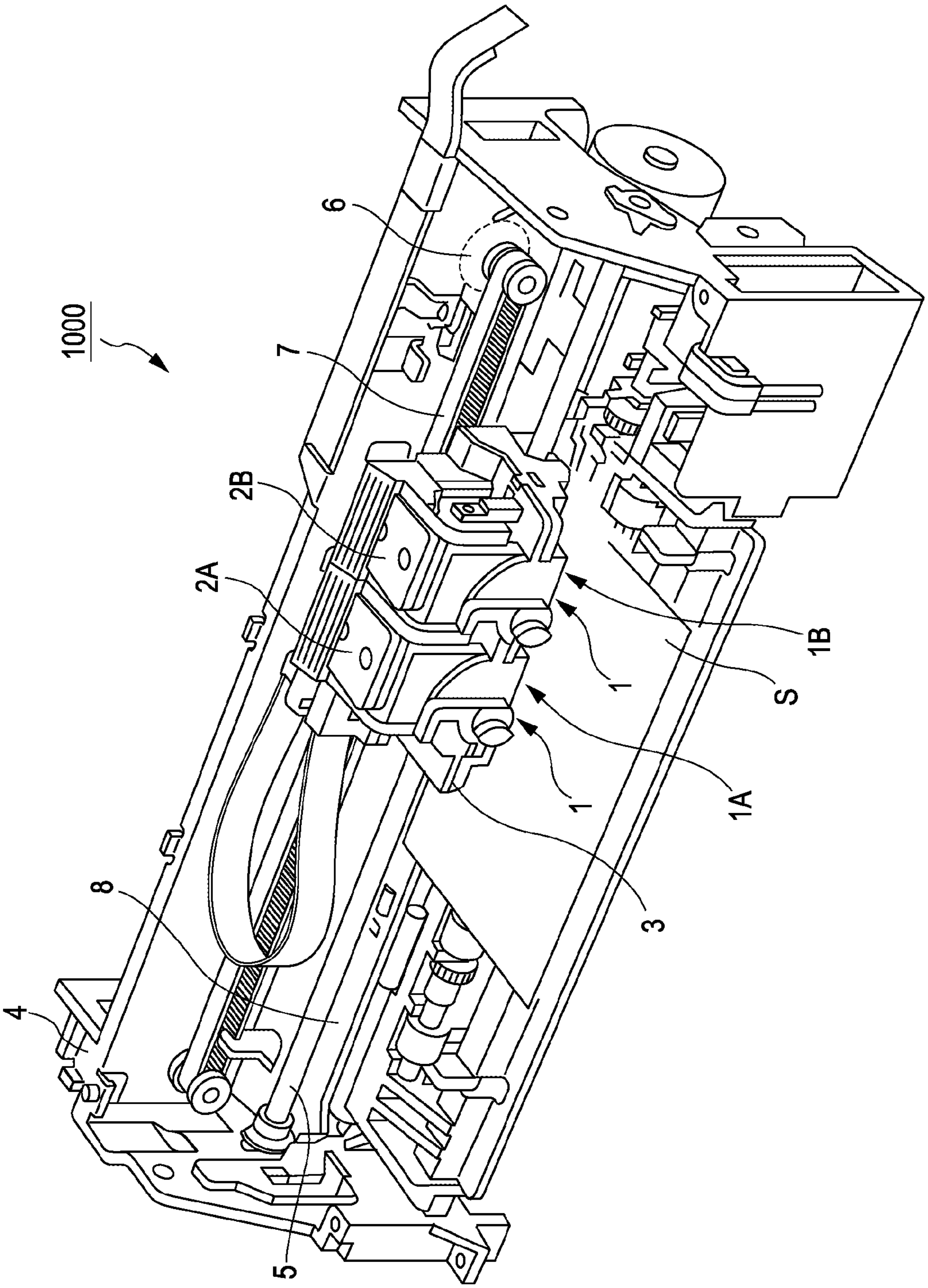
FIG. 1 is a schematic perspective view of an example of an ink-jet recording apparatus.

FIG. 1 is a schematic perspective view of an ink-jet recording apparatus 1000 serving as an example of a liquid-ejecting apparatus. The ink-jet recording apparatus 1000 includes ink-jet recording heads 1 serving as liquid-ejecting heads.

In FIG. 1, the ink-jet recording apparatus 1000 includes recording head units 1A and 1B. The recording head units 1A and 1B have detachable cartridges 2A and 2B, respectively, constituting ink supply units and are carried by a carriage 3 disposed on a carriage shaft 5 attached to a main body 4 so as to be movable in the axial direction thereof.

The recording head units 1A and 1B eject, for example, a black ink composition and a color ink composition, respectively. The carriage 3 carrying the recording head units 1A and 1B moves along the carriage shaft 5 as driving force is transmitted from a drive motor 6 to the carriage 3 via a plurality of gears (not shown) and a timing belt 7. The main body 4, on the other hand, has a platen 8 disposed along the carriage shaft 5 so that a recording sheet S, that is, a recording medium such as paper, fed by a feed roller (not shown) is transported over the platen 8.

The recording head units 1A and 1B have ink-jet recording heads 1 opposite the recording sheet S. The ink-jet recording heads 1, which are not directly shown in FIG. 1, are disposed on the recording sheet S side of the recording head units 1A and 1B.

Figure 2:
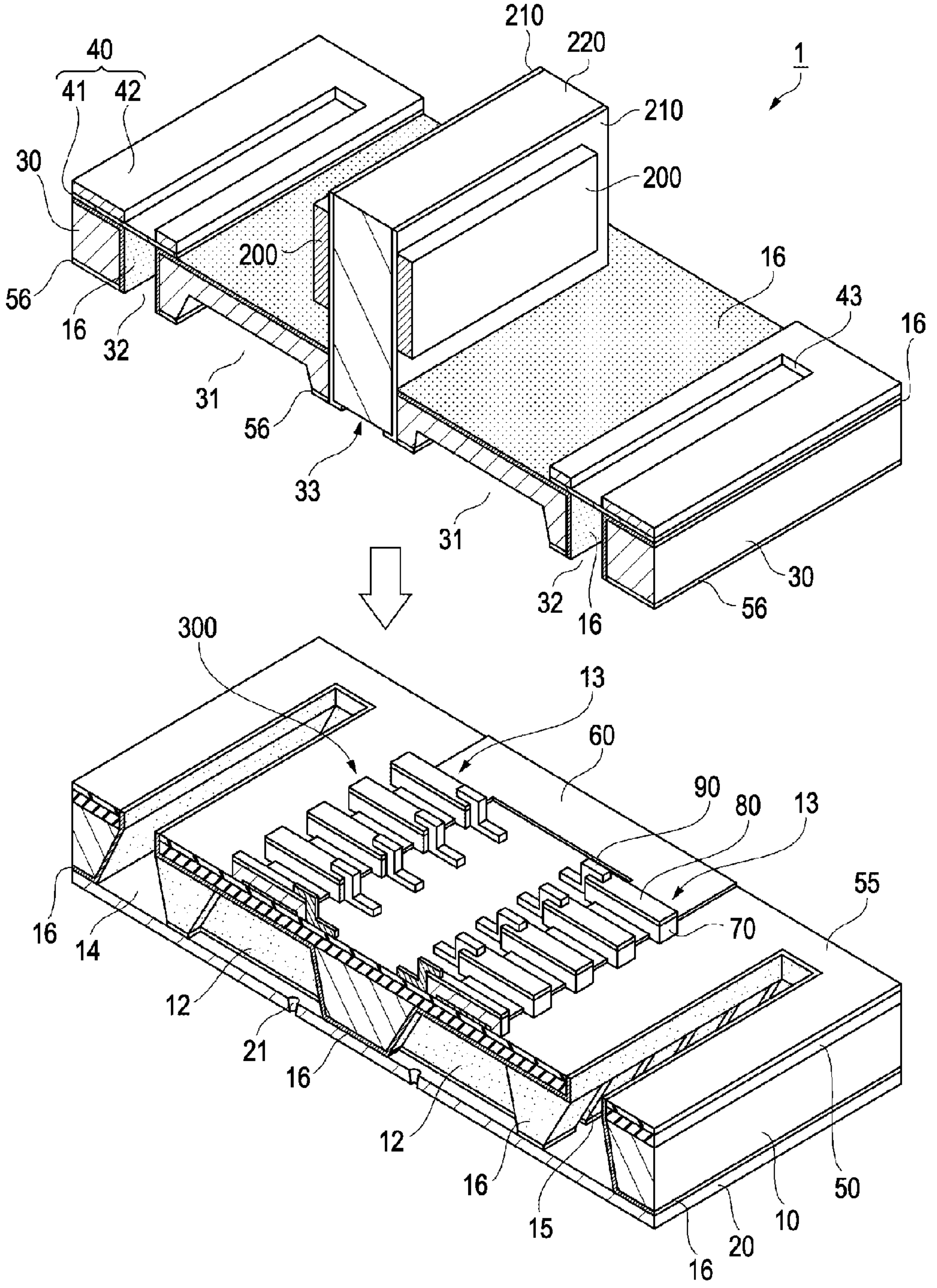
FIG. 2 is a partial exploded perspective view schematically showing an ink-jet recording head.

FIG. 2 shows a partial exploded perspective view of an ink-jet recording head 1 according to the embodiment. FIG. 2 is a partial exploded perspective view of the ink-jet recording head 1, which is substantially rectangular, taken along a plane perpendicular to the longitudinal direction thereof (the direction indicated by the empty arrow in FIG. 2).

Figure 3A:
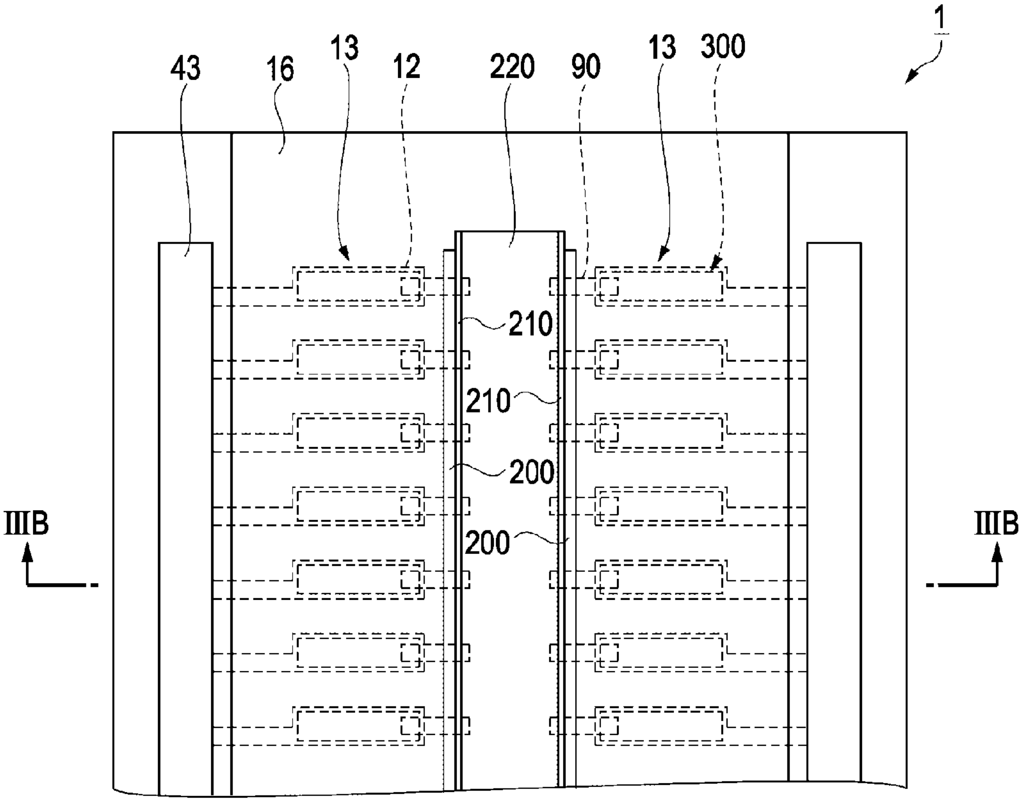
FIG. 3A is a partial plan view of the ink-jet recording head.
Figure 3B:
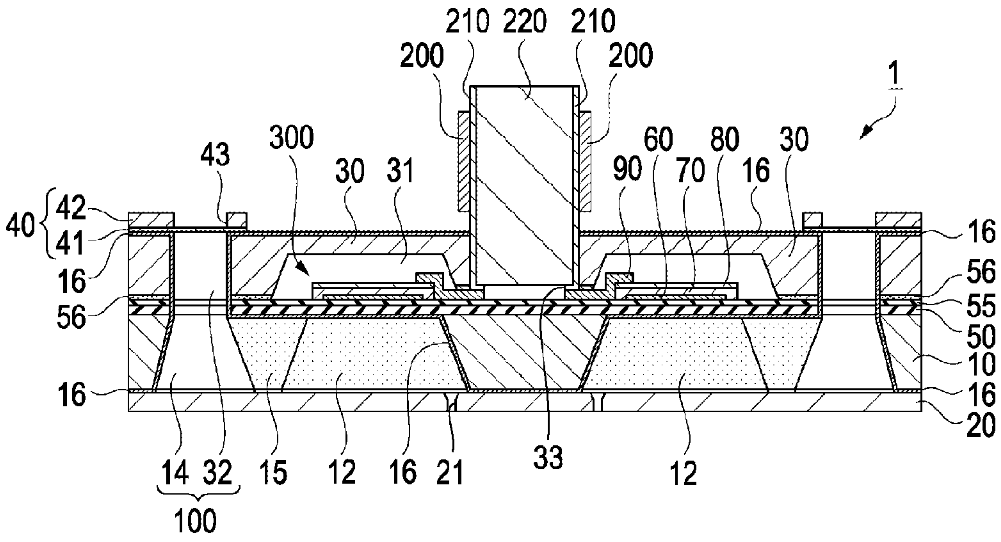
FIG. 3B is a partial sectional view taken along line IIIB-IIIB in FIG. 3A.

FIG. 3A shows a partial plan view of the ink-jet recording head 1, and FIG. 3B shows a sectional view taken along line IIIB-IIIB in FIG. 3A.

In FIGS. 2 and 3, the ink-jet recording head 1 includes a passage-forming substrate 10, a nozzle plate 20, a protective substrate 30, compliant substrates 40, and two wiring substrates on which drive circuits 200 are mounted, specifically, COF substrates 210.

The passage-forming substrate 10, the nozzle plate 20, and the protective substrate 30 are stacked such that the passage-forming substrate 10 is held between the nozzle plate 20 and the protective substrate 30. The compliant substrates 40 are disposed on the protective substrate 30.

The two COF substrates 210 have a spacer 220 disposed therebetween and are inserted into the protective substrate 30.

The passage-forming substrate 10 is formed of a (110) silicon single-crystal substrate. The passage-forming substrate 10 has a plurality of pressure-generating chambers 12 formed in two rows 13 by anisotropic etching. The rows 13 are arranged in parallel in the width direction of the ink-jet recording head 1 (the direction perpendicular to the longitudinal direction). The pressure-generating chambers 12 have a trapezoidal cross-section in the width direction of the ink-jet recording head 1 and are elongated in the width direction of the ink-jet recording head 1.

Communicating channels 14 are formed in the passage-forming substrate 10 outside the pressure-generating chambers 12 in the longitudinal direction of the pressure-generating chambers 12. The communicating channels 14 communicate with the pressure-generating chambers 12 through ink supply channels 15, serving as liquid supply channels, provided in the pressure-generating chambers 12. The ink supply channels 15 are narrower than the pressure-generating chambers 12 so that they maintain a constant flow resistance in ink flowing from the communicating channels 14 into the pressure-generating chambers 12.

The nozzle plate 20 has nozzle orifices 21 communicating with the outside near the ends of the pressure-generating chambers 12 away from the ink supply channels 15.

The nozzle plate 20 is formed of, for example, glass ceramic, single-crystal silicon, or stainless steel.

The nozzle plate 20 is bonded to the passage-forming substrate 10 with a protective film 16 therebetween using, for example, an adhesive or a heat-fusible film.

An elastic film 50 constituting a diaphragm is formed on the surface of the passage-forming substrate 10 opposite the surface to which the nozzle plate 20 is bonded. The elastic film 50 is an oxide film formed by thermal oxidation.

An insulating oxide film 55 is formed on the elastic film 50 on the passage-forming substrate 10. A lower electrode 60 of a metal such as platinum (Pt) or a metal oxide such as strontium ruthenate (SrRuO), piezoelectric layers 70 having a perovskite structure, and upper electrodes 80 of a metal such as gold (Au) or iridium (Ir) are formed on the insulating film 55, constituting piezoelectric devices 300. The piezoelectric devices 300 include the lower electrode 60, the piezoelectric layers 70, and the upper electrodes 80.

Typically, one of the electrodes of each piezoelectric device 300 is formed as a common electrode, whereas the other electrode and the piezoelectric layer 70 are formed above the pressure-generating chamber 12 by patterning. A portion that includes the patterned electrode and the piezoelectric layer 70 and that undergoes piezoelectric strain when a voltage is applied across the two electrodes is referred to as "piezoelectric active portion."

Although in the embodiment the lower electrode 60 is used as the common electrode for the piezoelectric devices 300 and the upper electrodes 80 are used as the separate electrodes for the piezoelectric devices 300, the relationship thereof may be reversed in view of arranging the drive circuits 200 and the wiring. In either case, the piezoelectric active portions are formed for the individual pressure-generating chambers 12. The piezoelectric devices 300 and the portions of the elastic film 50 and the insulating film 55 (diaphragm) that are displaced by driving the piezoelectric devices 300 are collectively referred to as "piezoelectric actuators."

Leads 90 of, for example, gold (Au) are connected to the upper electrodes 80 of the piezoelectric devices 300 and are extended to the region between the rows 13 of the pressure-generating chambers 12.

The protective substrate 30 is bonded to the passage-forming substrate 10 having the piezoelectric devices 300 with an adhesive 56.

The protective substrate 30 has two piezoelectric-device accommodating portions 31 opposite the piezoelectric devices 300 such that they form spaces large enough not to obstruct the movement of the piezoelectric devices 300. The piezoelectric-device accommodating portions 31 correspond to the two rows 13 of the pressure-generating chambers 12.

Although in the embodiment the piezoelectric-device accommodating portions 31 are integrally formed opposite the rows 13 of the pressure-generating chambers 12, they may be formed separately for the individual piezoelectric devices 300.

The protective substrate 30 may be formed of, for example, glass, ceramic, metal, or resin, and is preferably formed of a material having substantially the same thermal expansion coefficient as the passage-forming substrate 10. In the embodiment, the protective substrate 30 is formed of the same material as the passage-forming substrate 10, namely, single-crystal silicon.

In addition, the protective substrate 30 has reservoirs 32 opposite the communicating channels 14 of the passage-forming substrate 10. In the embodiment, the reservoirs 32 penetrate the protective substrate 30 in the thickness direction thereof and extend along the rows 13 of the pressure-generating chambers 12. The reservoirs 32 communicate with the communicating channels 14 of the passage-forming substrate 10 to constitute manifolds 100 serving as common ink chambers for the pressure-generating chambers 12.

Furthermore, the protective substrate 30 has a through-hole 33 penetrating the protective substrate 30 in the thickness direction thereof substantially in the center of the protective substrate 30 in the direction perpendicular to the longitudinal direction (the direction indicated by the empty arrow in FIG. 2), that is, opposite the region between the rows 13 of the pressure-generating chambers 12.

The leads 90 extended from the piezoelectric devices 300 have at least the ends thereof (lead terminals) exposed in the bottom of the through-hole 33. The ends of the leads 90 exposed in the through-hole 33 are electrically connected to wiring (not shown) formed on the COF substrates 210. The piezoelectric devices 300 are driven by the drive circuits 200 mounted on the COF substrates 210.

Although the leads 90 are directly connected to the wiring of the COF substrates 210 in the embodiment, the leads 90 may be indirectly connected to the wiring of the COF substrates 210, for example, with another member disposed between the COF substrates 210 and the ends of the leads 90 (lead terminals). That is, the leads 90 may be exposed in the through-hole 33 and electrically connected to the wiring substrates in any manner.

Drive signals include drive signals for driving drive ICs, such as drive power signals, and various control signals such as serial signals (SI), and the wiring is composed of a plurality of wiring lines supplied with the respective signals.

The compliant substrates 40 bonded to the protective substrate 30 are each composed of a sealing film 41 and a securing plate 42. The sealing film 41 is formed of a flexible material with low rigidity (for example, a polyphenylene sulfide (PPS) film having a thickness of 6 μm) and seals off one side of the reservoir 32. The securing plate 42, on the other hand, is formed of a hard material such as a metal (for example, a stainless steel (SUS) plate having a thickness of 30 μm). The securing plate 42 has an opening 43 formed in the thickness direction thereof opposite the manifold 100, which is sealed off only by the flexible sealing film 41 on one side thereof.

The protective film 16 is provided on the inner surfaces of the liquid channels of the passage-forming substrate 10, including the pressure-generating chambers 12, the ink supply channels 15, and the manifolds 100, and on the surfaces of the protective substrate 30. The protective film 16 is formed of a material having etching resistance to ink, which is an alkaline liquid (ink resistance).

The protective film 16 may be formed of any material having ink resistance, such as tantalum oxide, zirconium oxide, nickel, or chromium. In this embodiment, for example, tantalum pentaoxide, which can be formed by CVD, is used.

Although in this embodiment the protective film 16 is also provided on the surfaces of the protective substrate 30 that do not come into contact with ink, the protective film 16 do not have to be provided on the surfaces of the protective substrate 30 that do not come into contact with ink.

The ink-jet recording heads 1 are supplied with the inks from the cartridges 2A and 2B and are filled with the inks from the manifolds 100 to the nozzle orifices 21. Based on a recording signal from the drive circuits 200, a voltage is applied across the lower electrode 60 and the upper electrodes 80 corresponding to the pressure-generating chambers 12 to cause flexural deformation of the elastic film 50 and the piezoelectric layers 70. This increases the inner pressures of the pressure-generating chambers 12, thus ejecting ink droplets from the nozzle orifices 21.

A method for producing the ink-jet recording heads 1 will now be described with reference to FIGS. 4 to 8M.

The ink-jet recording heads 1 are produced by forming a plurality of ink-jet recording heads 1 as a wafer and dividing the wafer into chips each including the passage-forming substrate 10 as shown in FIGS. 2 and 3. The description below will focus on one ink-jet recording head 1.

If a plurality of ink-jet recording heads 1 are formed as a wafer, unnecessary peripheral portions are removed by cutting, for example, dicing.

Figure 4:
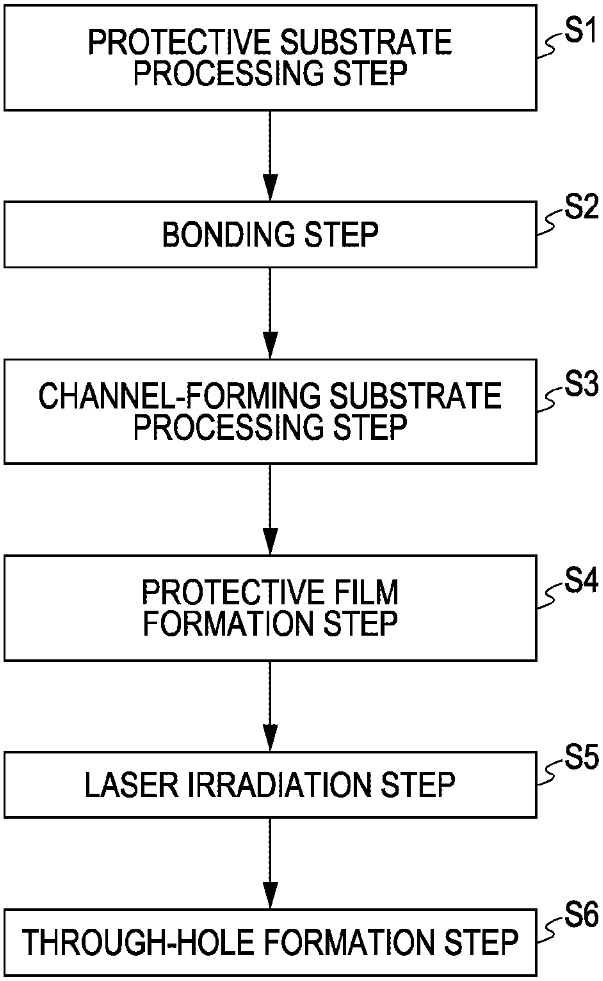
FIG. 4 is a flowchart of a method for producing the ink-jet recording head.

FIG. 4 is a flowchart of the method for producing the ink-jet recording heads 1. FIGS. 5A to 8M are partial sectional views, taken along a plane perpendicular to the longitudinal direction, illustrating the method for producing the ink-jet recording heads 1.

As shown in FIG. 4, the method for producing the ink-jet recording heads 1 includes a protective substrate processing step as Step 1 (S1), a bonding step as Step 2 (S2), a passage-forming substrate processing step as Step 3 (S3), a protective film formation step as Step 4 (S4), a laser irradiation step as Step 5 (S5), and a through-hole formation step as Step 6 (S6).

FIGS. 5A to 5E illustrate the protective substrate processing step (S1). FIG. 6F illustrates the bonding step (S2). FIGS. 6G to 7I illustrate the passage-forming substrate processing step (S3). FIG. 7J illustrates the protective film formation step (S4). FIG. 8L illustrates the laser irradiation step (S5). FIG. 8M illustrates the through-hole formation step (S6).

Figure 5A:
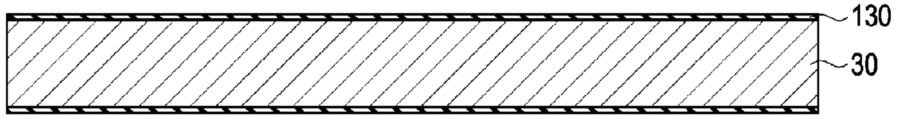
FIG. 5A is a partial sectional view, taken along a plane perpendicular to the longitudinal direction, illustrating the method for producing the ink-jet recording head.
Figure 6F:
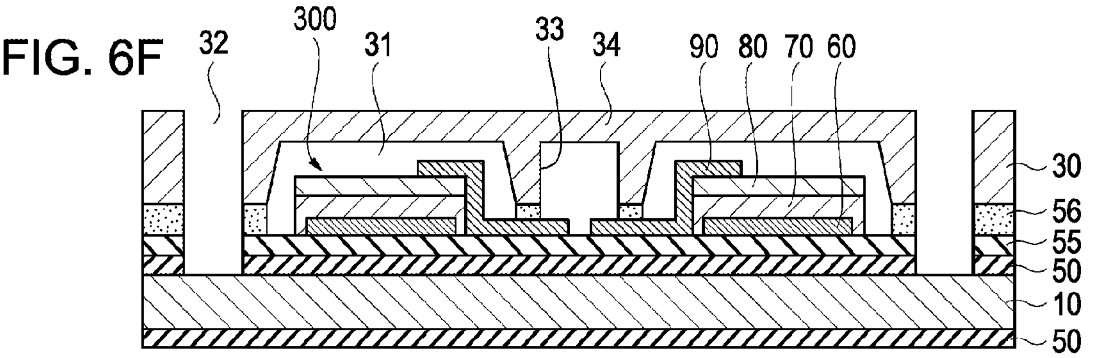
FIG. 6F is a partial sectional view, taken along a plane perpendicular to the longitudinal direction, illustrating the method for producing the ink-jet recording head.

Referring to FIG. 5A, in the protective substrate processing step (S1), the protective substrate 30, specifically, a silicon substrate, is thermally oxidized in a diffusion furnace at about 1,100° C. to form a silicon dioxide film 130 on the surface thereof. The protective substrate 30 used has a thickness of, for example, about 400 μm.

Figure 5B:
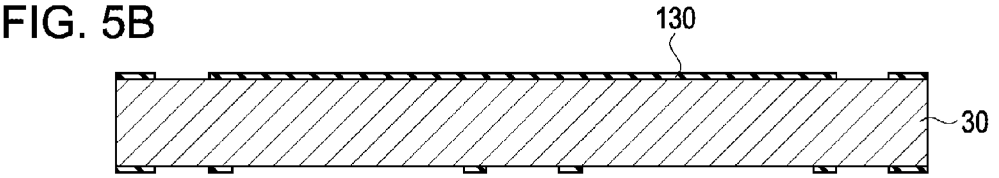
FIG. 5B is a partial sectional view, taken along a plane perpendicular to the longitudinal direction, illustrating the method for producing the ink-jet recording head.

Referring to FIG. 5B, in the protective substrate processing step (S1), the silicon dioxide film 130 is patterned by a known photoresist process, specifically, applying a resist, exposing and developing the resist, and etching the silicon dioxide film 130.

Figure 5C:
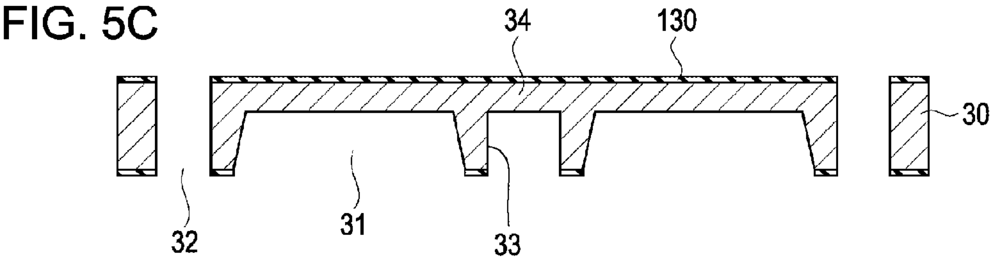
FIG. 5C is a partial sectional view, taken along a plane perpendicular to the longitudinal direction, illustrating the method for producing the ink-jet recording head.

Referring to FIG. 5C, in the protective substrate processing step (S1), the piezoelectric-device accommodating portions 31 and a portion of the through-hole 33, shown in FIGS. 2 and 3, are formed by etching the protective substrate 30 in the same etching process while leaving a lid 34 closing off the through-hole 33.

Figure 5D:
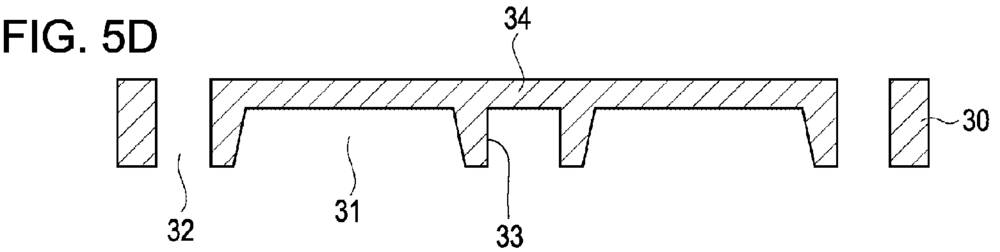
FIG. 5D is a partial sectional view, taken along a plane perpendicular to the longitudinal direction, illustrating the method for producing the ink-jet recording head.

Referring to FIG. 5D, in the protective substrate processing step (S1), the silicon dioxide film 130 is removed.

The piezoelectric-device accommodating portions 31 and a portion of the through-hole 33 may be formed under different etching conditions. The etched shapes shown are simplified for illustration purposes, and the actual shapes are not limited thereto.

Figure 5E:
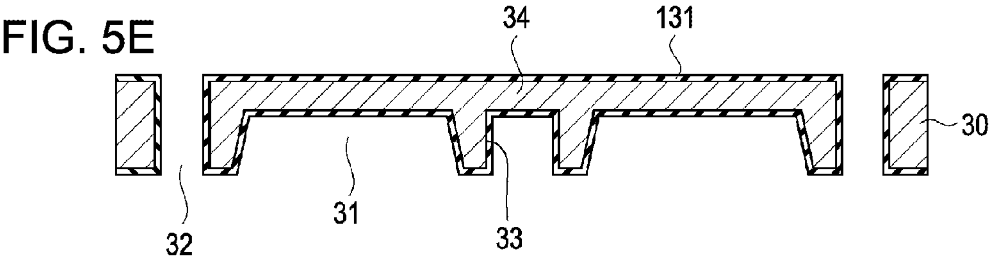
FIG. 5E is a partial sectional view, taken along a plane perpendicular to the longitudinal direction, illustrating the method for producing the ink-jet recording head.

Referring to FIG. 5E, in the protective substrate processing step (S1), the etched protective substrate 30 is thermally oxidized again to form a silicon dioxide film 131 serving as an insulating film. The silicon dioxide film 131 can be formed by the same method as the silicon dioxide film 130 shown in FIG. 5A. The silicon dioxide film 131 is not shown in the subsequent drawings.

Referring to FIG. 6F, in the bonding step (S2), the protective substrate 30 is positioned opposite the passage-forming substrate 10 having the piezoelectric devices 300, which is prepared by another process, such that the piezoelectric-device accommodating portions 31 accommodate the piezoelectric devices 300, and is bonded to the passage-forming substrate 10 using the adhesive 56.

The bonding is performed by priming the surfaces to be bonded, transferring the adhesive 56 to the surface of the protective substrate 30 to be bonded, laminating and temporarily bonding the passage-forming substrate 10 and the protective substrate 30, and curing the adhesive 56.

The protective substrate 30 bonded to the passage-forming substrate 10 significantly improves the rigidity of the passage-forming substrate 10 because the protective substrate 30 has a thickness of, for example, about 400 μm.

For example, the passage-forming substrate 10 is prepared as follows.

The passage-forming substrate 10 is thermally oxidized in a diffusion furnace at about 1,100° C. to form a silicon dioxide film serving as the elastic film 50 on the surface thereof.

A zirconium film is then formed on the elastic film 50. The zirconium film can be formed by, for example, sputtering. The zirconium film is thermally oxidized in a diffusion furnace at about 500° C. to 1,200° C. to form a zirconium oxide film serving as the insulating film 55. The elastic film 50 and the insulating film 55 constitute a diaphragm.

A lower electrode film of, for example, platinum (Pt) and iridium (Ir) is formed on the surface of the insulating film 55 and is then patterned into a predetermined pattern.

For example, the lower electrode 60 shown in FIGS. 2 and 3 is formed by depositing an iridium film and a platinum film by sputtering and patterning the deposited films into a predetermined pattern.

A piezoelectric layer film of a piezoelectric material is then formed on the lower electrode 60 and the insulating film 55. The piezoelectric material used may be lead zirconate titanate (PZT).

The piezoelectric layer film can be formed by the sol-gel process, in which a solution or dispersion of an organometallic compound, that is, a sol, is gelled by coating and drying and is fired at elevated temperature to form a metal oxide piezoelectric layer film.

Instead of the sol-gel process, the piezoelectric layer film may be formed by, for example, metal-organic decomposition (MOD). In addition, the piezoelectric layer film may be formed by a process other than such liquid-phase processes, for example, by sputtering.

The sol-gel process will now be described in more detail. First, a sol (solution) containing an organometallic compound is applied. The piezoelectric precursor film thus formed is dried by heating it to a predetermined temperature for a predetermined period of time to evaporate the solvent from the sol. The piezoelectric precursor film is further degreased in the atmosphere at a predetermined temperature for a predetermined period of time.

As used herein, the term "degreasing" refers to the removal of organic components from a sol film as, for example, $NO_2$, $CO_2$, or $H_2O$.

The piezoelectric precursor film is deposited to a predetermined thickness by repeating the coating, drying, and degreasing steps a predetermined number of times, for example, twice. The piezoelectric precursor film is then heated in, for example, a diffusion furnace so that it crystallizes, thus forming a piezoelectric film. That is, a piezoelectric film is formed by firing the piezoelectric precursor film so that crystals grow.

Preferably, the piezoelectric film is formed by firing the piezoelectric precursor film at about 650° C. to 850° C., for example, about 700° C. for 30 minutes. The piezoelectric film formed under such conditions have the crystals thereof preferentially oriented along the (100) plane.

The coating, drying, degreasing, and firing steps described above are repeated multiple times to form a piezoelectric layer film of predetermined thickness including a plurality of piezoelectric films.

The piezoelectric layer film may be formed of, for example, a relaxor ferroelectric, which is formed by adding a metal such as niobium, nickel, magnesium, bismuth, or yttrium to a ferroelectric piezoelectric material such as lead zirconate titanate. The piezoelectric layer film may also be formed of a lead-free piezoelectric material.

After the formation of the piezoelectric layer film, an upper electrode film of, for example, iridium is formed over the entire surface of the piezoelectric layer film. The upper electrode film can be formed by sputtering, for example, DC or RF sputtering.

The piezoelectric layer film and the upper electrode film are patterned so as to remain in the regions opposite the pressure-generating chambers 12, thus forming the piezoelectric devices 300 including the lower electrode 60, the piezoelectric layers 70, and the upper electrodes 80.

A metal layer, such as a gold (Au) layer, is formed over the entire surface of the passage-forming substrate 10 and is patterned via a mask pattern (not shown) formed of, for example, a resist to form the leads 90 for the individual piezoelectric devices 300.

Figure 6G:
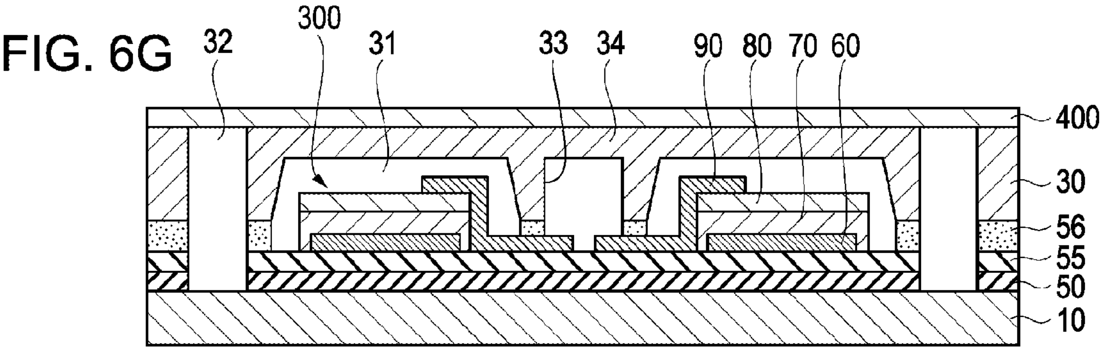
FIG. 6G is a partial sectional view, taken along a plane perpendicular to the longitudinal direction, illustrating the method for producing the ink-jet recording head.

Referring to FIG. 6G, in the passage-forming substrate processing step (S3), the passage-forming substrate 10 is polished to a certain thickness and is etched to a predetermined thickness by wet etching with hydrofluoric-nitric acid. For example, the passage-forming substrate 10 can be etched to a thickness of about 70 μm.

In this step, a tape 400 is laminated on the protective substrate 30 to prevent a damage due to wet etching.

Figure 6H:
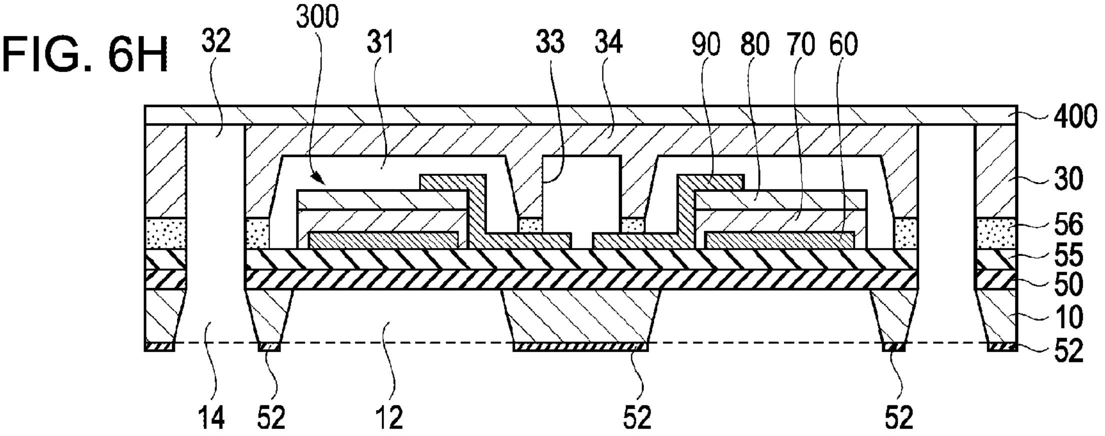
FIG. 6H is a partial sectional view, taken along a plane perpendicular to the longitudinal direction, illustrating the method for producing the ink-jet recording head.
Figure 7I:
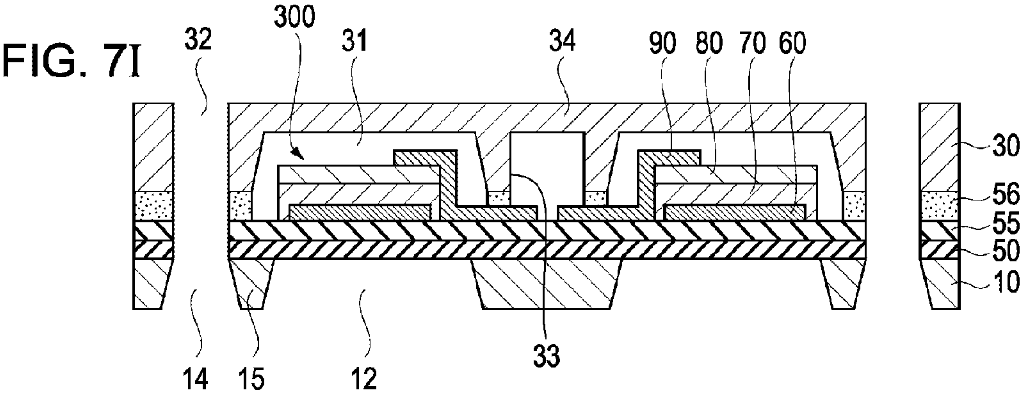
FIG. 7I is a partial sectional view, taken along a plane perpendicular to the longitudinal direction, illustrating the method for producing the ink-jet recording head.
Figure 7J:
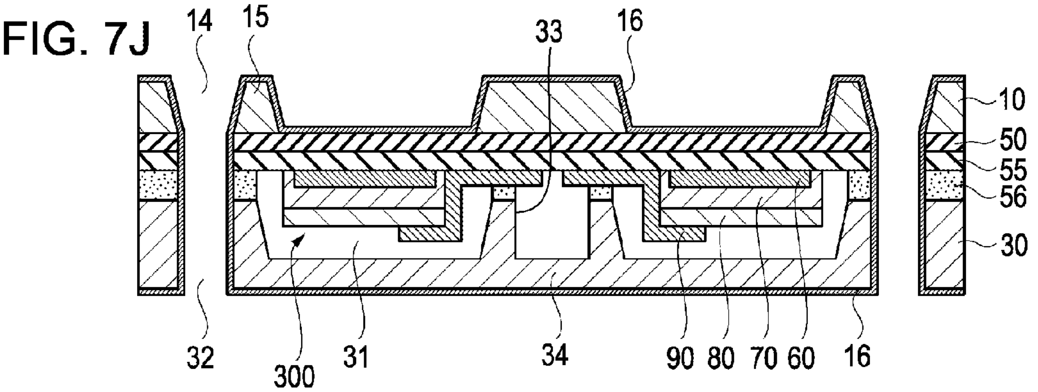
FIG. 7J is a partial sectional view, taken along a plane perpendicular to the longitudinal direction, illustrating the method for producing the ink-jet recording head.
Figure 8L:
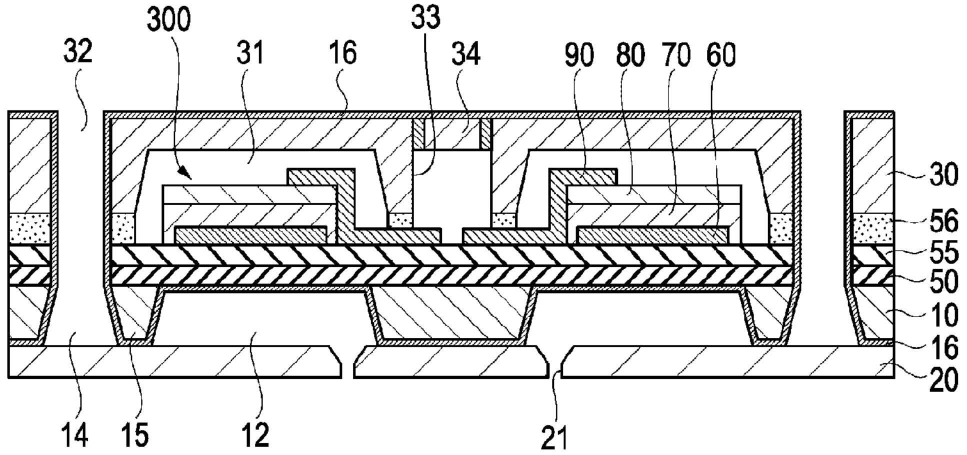
FIG. 8L is a partial sectional view, taken along a plane perpendicular to the longitudinal direction, illustrating the method for producing the ink-jet recording head.
Figure 8M:
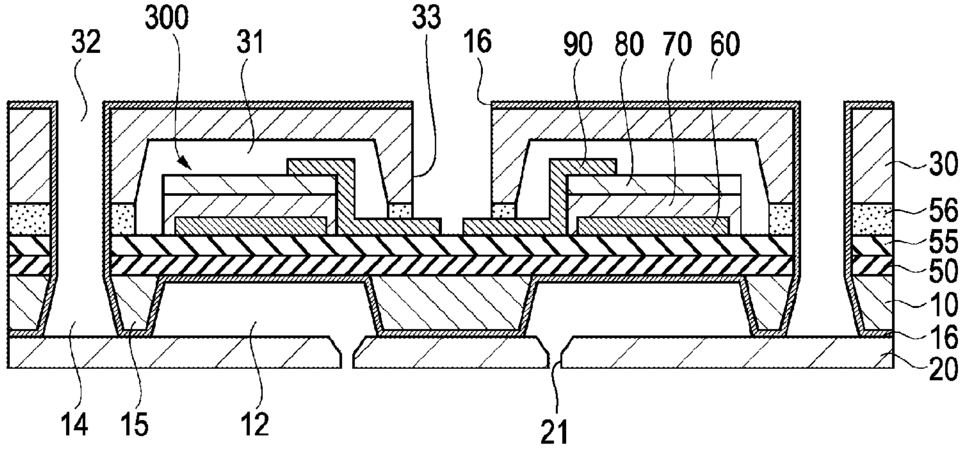
FIG. 8M is a partial sectional view, taken along a plane perpendicular to the longitudinal direction, illustrating the method for producing the ink-jet recording head.

Referring to FIGS. 6H and 7I, in the passage-forming substrate processing step (S3), a mask film 52 of, for example, silicon nitride (SiN) is formed on the surface of the passage-forming substrate 10 on the droplet ejection side and is patterned into a predetermined pattern. The passage-forming substrate 10 is then anisotropically etched through the mask film 52 to form the pressure-generating chambers 12, the communicating channels 14, and the ink supply channels 15 in the passage-forming substrate 10.

Subsequently, the tape 400 and the mask film 52 are removed. The tape 400 may have low heat resistance because it is removed before the protective film formation step (S4).

Referring to FIG. 7J, in the protective film formation step (S4), the protective film 16 is formed. The protective film 16 is preferably formed by a deposition process advantageous in terms of gas spreading because it must be formed on the inner surfaces of the complicated liquid channels such as the reservoirs 32 and the communicating channels 14, which are the surfaces of the passage-forming substrate 10 and the protective substrate 30 bonded thereto. In this embodiment, the protective film 16 is deposited by CVD. The deposition can be performed on a batch of wafers.

The source gas used can be, for example, pentaethoxytantalum ($Ta(OC_2H_5)_5$), which is liquid. The source gas containing the protective film component is vaporized by a vaporizer and is introduced into a reaction chamber together with a carrier gas, specifically, $N_2$. At the same time, oxygen is introduced, and pentaethoxytantalum is thermally decomposed in the reaction chamber to form a tantalum oxide thin film, specifically, a tantalum pentaoxide thin film. For example, if the protective film 16 is formed of a nitride film, it may be formed by physical vapor deposition (PVD). In other words, the protective film 16 may be formed by any process other than wet processes (liquid coating), that is, by a dry process.

Figure 7K:
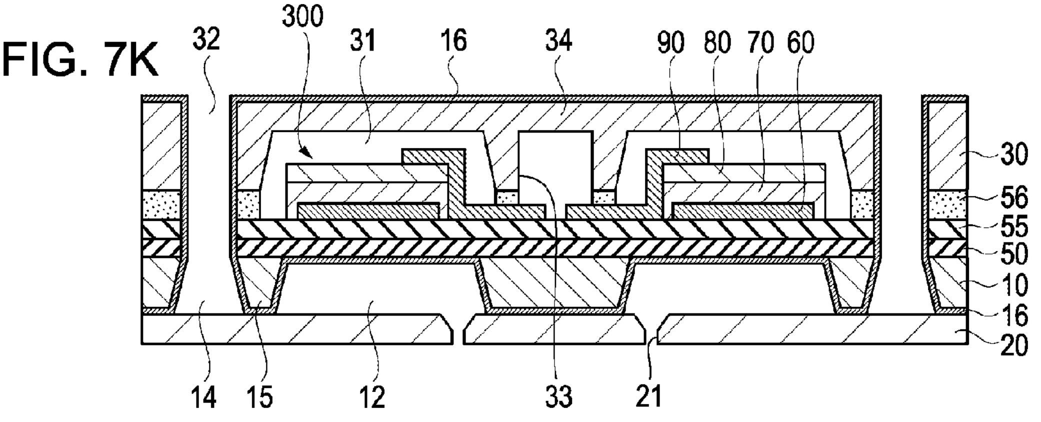
FIG. 7K is a partial sectional view, taken along a plane perpendicular to the longitudinal direction, illustrating the method for producing the ink-jet recording head.

Referring to FIG. 7K, the nozzle plate 20 having the nozzle orifices 21 is bonded to the surface of the passage-forming substrate 10 opposite the surface to which the protective substrate 30 is bonded.

Referring to FIG. 8L, in the laser irradiation step (S5), the periphery of the lid 34 is irradiated with laser light. The laser irradiation preferably includes focusing the laser light in the interior of the protective substrate 30 to form a modified region.

Referring to FIG. 8M, in the through-hole formation step (S6), the lid 34 is removed to form the through-hole 33.

FIGS. 9A to 9E are partial sectional views illustrating the laser irradiation step (S5) and the through-hole formation step (S6) together in detail, where the protective film 16 is not shown.

Figure 9A:
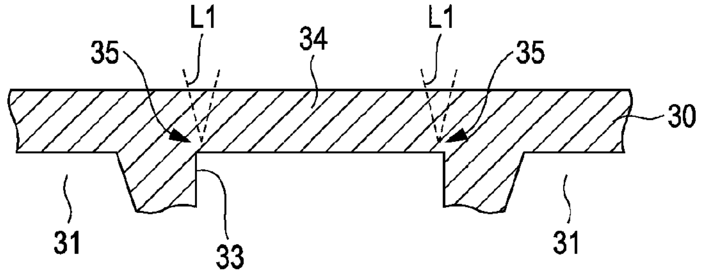
FIG. 9A is a partial sectional view illustrating a laser irradiation step and a through-hole formation step together in detail.

Referring to FIG. 9A, in the laser irradiation step (S5), the protective substrate 30, which is a silicon substrate, is irradiated with laser light L1 in the infrared region, for example, laser light L1 from a YAG laser (Nb) having a wavelength of 1,064 nm, such that the laser light L1 is focused in the interior of the protective substrate 30. The focus is set to a position in the interior of the protective substrate 30 closer to the side where the piezoelectric-device accommodating portions 31 and a portion of the through-hole 33 are formed along the periphery of the lid 34. The laser light L1 is scanned along the periphery of the lid 34. By irradiation with the laser light L1, modified regions 35 of polycrystalline silicon are formed in the interior of the protective substrate 30.

Figure 9B:
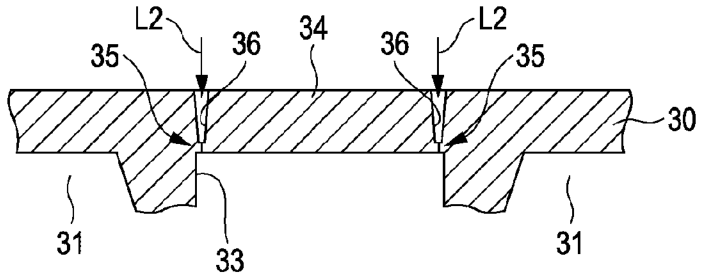
FIG. 9B is a partial sectional view illustrating the laser irradiation step and the through-hole formation step together in detail.

Referring to FIG. 9B, in the laser irradiation step (S5), the protective substrate 30 is irradiated with laser light L2 in the visible region, for example, laser light L2 from a YAG laser (Nb) having a wavelength of 532 nm (second harmonic). The irradiation is performed along the periphery of the lid 34 on the side of the protective substrate 30 opposite the side where the piezoelectric-device accommodating portions 31 and a portion of the through-hole 33 are formed. By irradiation, grooves 36 are formed. The grooves 36 are formed so as to leave the modified regions 35.

Figure 9C:
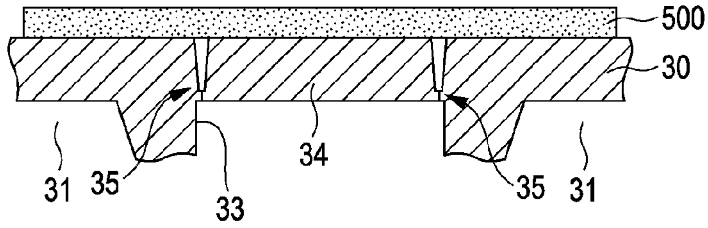
FIG. 9C is a partial sectional view illustrating the laser irradiation step and the through-hole formation step together in detail.

Referring to FIG. 9C, in the through-hole formation step (S6), an ultraviolet-curable (UV-curable) tape 500 serving as an adhesive-coated tape is laminated on the side of the protective substrate 30 opposite the side where the piezoelectric-device accommodating portions 31 and a portion of the through-hole 33 are formed.

Figure 9D:
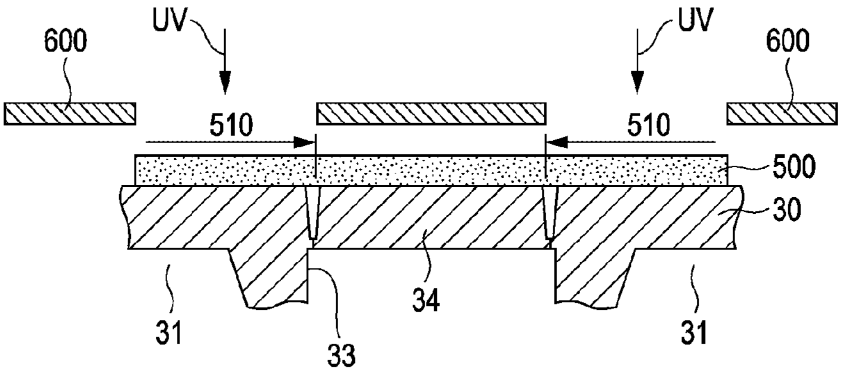
FIG. 9D is a partial sectional view illustrating the laser irradiation step and the through-hole formation step together in detail.

Referring to FIG. 9D, in the through-hole formation step (S6), the ultraviolet-curable tape 500 bonded to the lid 34 is irradiated with ultraviolet light in regions 510 other than a region 520 through a mask 600. The ultraviolet-curable tape 500 is cured by irradiation with ultraviolet light in the regions 510 so that the adhesion thereof is decreased in the regions 510.

Figure 9E:
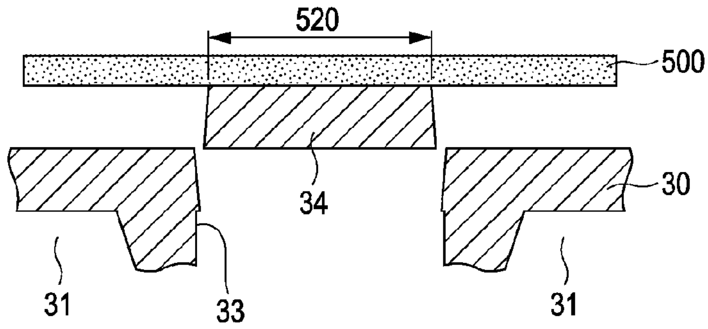
FIG. 9E is a partial sectional view illustrating the laser irradiation step and the through-hole formation step together in detail.

Referring to FIG. 9E, in the through-hole formation step (S6), the ultraviolet-curable tape 500 is peeled from the protective substrate 30. The ultraviolet-curable tape 500 can be readily peeled in the regions 510, where the adhesion has been decreased. On the other hand, the ultraviolet-curable tape 500 adheres to the lid 34 in the region 520, where the adhesion is maintained. The lid 34 is removed together with the ultraviolet-curable tape 500 from the protective substrate 30. Thus, the through-hole 33 is formed in the protective substrate 30.

Finally, the compliant substrates 40 are bonded to the protective substrate 30, the wafer is divided into chips each including the passage-forming substrate 10 as shown in FIGS. 2 and 3, and the COF substrates 210 are connected thereto. Thus, the ink-jet recording heads 1 are obtained.

The ink-jet recording heads 1 are mounted on an ink-jet recording apparatus, constituting portions of recording head units having ink channels communicating with ink cartridges serving as ink supply units.

This embodiment has the following advantages.

(1) Because the through-hole 33, into which the COF substrates 210 are to be inserted, is closed off by the lid 34 before the protective film 16 is formed by CVD, the lid 34 prevents the source gas used for CVD from intruding into the through-hole 33 to avoid formation of the protective film 16 on the leads 90 extended into the through-hole 33. This reduces the possibility of a continuity failure between the leads 90 and the COF substrates 210, thus providing a method for producing the ink-jet recording heads 1 at reduced production costs.

(2) Because the periphery of the lid 34 is removed or modified by irradiation with the laser light L1 and L2, the strength thereof can be made lower than that of the other region so that the lid 34 can be readily removed by the ultraviolet-curable tape 500.

In addition, the ultraviolet-curable tape 500 is removed without performing a step in which heat is applied after the lamination of the ultraviolet-curable tape 500. This allows the use of an ultraviolet-curable tape 500 that leaves behind little adhesive residue, thus providing a method for producing ink-jet recording heads 1 with little adhesive residue.

Furthermore, the ultraviolet-curable tape 500 can be selectively irradiated with ultraviolet light to weaken the adhesion of the adhesive in the region other than the lid 34. This allows less adhesive residue to be left behind and the lid 34 to be more readily removed.

(3) Because the modified regions 35 are formed in the interior of the protective substrate 30 by irradiation with the laser light L1 to remove the lid 34, less dust is produced as a result of surface melting due to irradiation with the laser light L1. This reduces the amount of dust in the pressure-generating chambers 12, the ink supply channels 15, the nozzle orifices 21, and the manifolds 100, thus providing a method for producing ink-jet recording heads 1 with little interference of dust with ink flows.

(4) Because a portion of the through-hole 33 is formed together with the piezoelectric-device accommodating portions 31 while leaving the lid 34 closing off the through-hole 33 in the protective substrate processing step (S1), a method for producing the ink-jet recording heads 1 at reduced production costs without the need for an additional step can be provided.

(5) Because tantalum oxide is resistant to alkali, a method for producing ink-jet recording heads 1 with high ink resistance can be provided.

In addition to the embodiment, various modifications are permitted.

For example, the laser irradiation step (S5) may be carried out before the through-hole formation step (S6), for example, during the protective substrate processing step (S1).

In addition, the laser irradiation step (S5) may be performed only by forming the modified regions 35 using the laser light L1 from a YAG laser (Nb) having a wavelength of 1,064 nm by focusing the laser light L1 in the interior of the protective substrate 30. In this case, the laser irradiation is performed multiple times by focusing the laser light L1 at varying depths to form the modified regions 35 across nearly the entire depth.

In this case, the laser light L1 does not melt the surface of the protective substrate 30. Thus, a method for producing ink-jet recording heads 1 containing less dust can be provided.

In addition, the tape used is not limited to the ultraviolet-curable tape 500 and may be a tape with low heat resistance, such as one similar to the tape 400.

In the laser irradiation step (S5), the lid 34 may be removed while being held by another member after the periphery of the lid 34 is all removed by laser irradiation.

The lid 34 does not necessarily have to be removed by laser light and tape. For example, the lid 34 may instead be removed by cutting using a cutter or by punching.

Although an ink-jet recording head has been described as an example of a liquid-ejecting head in the embodiment described above, the invention is broadly directed to all types of liquid-ejecting heads and may be applied to liquid-ejecting heads that eject liquids other than inks.

Other types of liquid-ejecting heads include various recording heads used for image-recording devices such as printers, colorant-ejecting heads used for producing color filters of devices such as liquid crystal displays, electrode-material ejecting heads used for forming electrodes of devices such as organic electroluminescent (EL) displays and field-emission displays (FED), and biological-organic-material ejecting heads used for producing biochips.

What is claimed is:

1. A method for producing a liquid-ejecting head including a passage-forming substrate and a protective substrate bonded thereto, the passage-forming substrate having pressure-generating chambers communicating with nozzle orifices from which a liquid is ejected, piezoelectric devices that change the inner pressures of the pressure-generating chambers, and liquid supply channels through which the liquid is supplied to the pressure-generating chambers, the protective substrate having a piezoelectric-device accommodating portion that protects the piezoelectric devices and a through-hole, through which wirings to lead electrodes extended from the piezoelectric devices pass thorough, the method comprising:

forming the piezoelectric-device accommodating portion and a portion of the through-hole in the protective substrate while leaving a lid, a portion of the protective substrate, closing off an opening of the through-hole;

bonding the protective substrate to the passage-forming substrate;

forming the pressure-generating chambers and the liquid supply channels in the passage-forming substrate;

forming a protective film on surfaces of the passage-forming substrate and the protective substrate bonded thereto; and removing the lid to complete the formation of the through-hole.

2. The method for producing the liquid-ejecting head according to claim 1, further comprising irradiating the periphery of the lid with laser light, wherein the formation of the through-hole includes laminating an adhesive-coated tape on the lid and removing the lid together with the adhesive-coated tape after the formation of the protective film and the laser irradiation.

3. The method for producing the liquid-ejecting head according to claim 2, wherein the laser irradiation includes focusing the laser light in the interior of the protective substrate to form a modified region.

4. The method for producing the liquid-ejecting head according to claim 1, wherein the liquid is an alkaline liquid and the protective film is a tantalum oxide film.

* * * * *